United States Patent
Rose et al.

(10) Patent No.: US 11,095,948 B2
(45) Date of Patent: *Aug. 17, 2021

(54) PRE-PITCHED METHOD AND SYSTEM FOR VIDEO ON DEMAND

(71) Applicant: GRASS VALLEY CANADA, Montreal (CA)

(72) Inventors: Scott Rose, Castle Donington (GB); Raed Al Tikriti, Reading (GB)

(73) Assignee: GRASS VALLEY CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,292

(22) Filed: Jan. 7, 2019

(65) Prior Publication Data
US 2019/0141401 A1 May 9, 2019

Related U.S. Application Data

(63) Continuation of application No. 15/154,557, filed on May 13, 2016, now Pat. No. 10,178,437.
(Continued)

(51) Int. Cl.
*H04N 21/472* (2011.01)
*H04N 21/4402* (2011.01)
(Continued)

(52) U.S. Cl.
CPC ... *H04N 21/47202* (2013.01); *H04N 21/2541* (2013.01); *H04N 21/4402* (2013.01);
(Continued)

(58) Field of Classification Search
None
See application file for complete search history.

(56) References Cited

U.S. PATENT DOCUMENTS

2002/0166120 A1  11/2002 Boylan et al.
2005/0097624 A1*  5/2005 Salo ............... H04N 21/26283
                                                    725/136
(Continued)

*Primary Examiner* — Jason K Lin
(74) *Attorney, Agent, or Firm* — Arent Fox LLP

(57) ABSTRACT

A network apparatus and a content distribution apparatus are described. The network apparatus is configured to transcode and transmit pre-broadcast content into transcoded content according to a format associated with a content distribution apparatus. The transcoded content includes a distribution indicator to restrict distribution of the transcoded content to one or more remote apparatus. Network apparatus is configured to transmit a "delta file" to content distribution apparatus with transcoded content and instructions to signal modifying the pre-broadcast content. Content distribution apparatus is configured to receive transcoded pre-broadcast content and "delta file" with instructions from network apparatus. Content distribution apparatus removes the distribution indicator from the transcoded pre-broadcast content once the signaling instructions indicates that the broadcast content corresponds with pre-broadcast content. Content distribution apparatus may use the "delta file" to modify the transcoded pre-broadcast content such that the modified pre-broadcast content corresponds with broadcast content with a tolerance.

22 Claims, 9 Drawing Sheets

Related U.S. Application Data

(60) Provisional application No. 62/299,519, filed on Feb. 24, 2016.

(51) Int. Cl.
*H04N 21/81* (2011.01)
*H04N 21/854* (2011.01)
*H04N 21/254* (2011.01)
*H04N 21/485* (2011.01)
*H04N 21/2225* (2011.01)

(52) U.S. Cl.
CPC ......... *H04N 21/485* (2013.01); *H04N 21/812* (2013.01); *H04N 21/854* (2013.01); *H04N 21/2225* (2013.01)

(56) References Cited

U.S. PATENT DOCUMENTS

| | | | | |
|---|---|---|---|---|
| 2005/0105528 A1* | 5/2005 | Kobayashi | ........... | H04N 21/235 370/390 |
| 2008/0219638 A1* | 9/2008 | Haot | ........ | G06F 16/40 386/250 |
| 2008/0301588 A1* | 12/2008 | Kumar | ........ | H04N 7/24 715/841 |
| 2009/0113498 A1* | 4/2009 | Yamamoto | ........ | H04N 21/4335 725/93 |
| 2010/0169914 A1 | 7/2010 | Williamson et al. | | |
| 2012/0079528 A1 | 3/2012 | Trimper et al. | | |
| 2012/0159174 A1* | 6/2012 | Gregotski | ........ | H04N 21/25875 713/176 |
| 2012/0159575 A1* | 6/2012 | Fukui | ........ | H04N 21/6408 726/3 |
| 2013/0202150 A1* | 8/2013 | Sinha | ........ | H04N 21/432 382/100 |
| 2014/0137153 A1* | 5/2014 | Fay | ........ | H04N 21/462 725/39 |
| 2014/0282671 A1* | 9/2014 | McMillan | ........ | H04N 21/44008 725/19 |
| 2014/0282772 A1* | 9/2014 | Chen | ........ | H04N 21/42201 725/97 |
| 2015/0026257 A1* | 1/2015 | Balakrishnan | ... | H04N 21/8405 709/204 |
| 2016/0057483 A1* | 2/2016 | Natarajan | ........ | H04N 21/8405 725/100 |
| 2016/0150285 A1* | 5/2016 | Thomas | ........ | H04N 21/47202 725/50 |
| 2016/0316452 A1* | 10/2016 | Huang | ........ | H04W 76/14 |
| 2017/0118533 A1* | 4/2017 | Holtz | ........ | G06Q 30/0269 |

* cited by examiner

PRE-PITCHED METHOD AND SYSTEM FOR VIDEO ON DEMAND

CROSS-REFERENCE TO RELATED APPLICATIONS

This application is a continuation of U.S. patent application Ser. No. 15/154,557, filed May 13, 2016, which in turn claims the benefit of priority to Provisional Patent Application No. 62/299,519, filed Feb. 24, 2016, the entire contents of each of which are herein incorporated by reference.

BACKGROUND

Field

The present disclosure relates generally to information management in media broadcasting and advertisement insertion, and more particularly, in timely providing video on demand content across all platforms including connected TV, web, mobile and social platforms.

Background

Media content providers, such as national television networks and television station groups, have evolved to serve the demand for online viewing across various formats and platforms in order to access new and existing audiences. As such, regular television broadcasts may be streamed over the internet as video on demand (VOD) and/or live streaming. Streamed viewing may use recorded broadcasts that may be time-shifted, that is, viewed after the live broadcast has aired. Recent broadcasts that are time-shift less than a week may include VOD content considered current and be counted in potentials for monetization. As such, time-shifted viewing such as offered by VOD, digital video recorders (DVRs) and online streaming have changed the approach to on-demand advertising models.

Many national broadcasters have expressed frustration in the loss of revenue from inability to quickly "turnaround" time-shifted files (e.g., VOD, catchup TV) in the on demand platforms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of distributing media at a network apparatus comprising: transcoding pre-broadcast content into transcoded content according to a format associated with a content distribution apparatus, wherein the transcoded content includes a distribution indicator with the transcoded content to restrict distribution of the transcoded content by the content distribution apparatus to one or more remote apparatus; and transmitting the transcoded content to the content distribution apparatus.

In an aspect of the disclosure, a method of distributing media at a content distribution apparatus, the method comprising: receiving transcoded pre-broadcast content from a network apparatus, wherein the transcoded pre-broadcast content includes a distribution indicator that restricts distribution of the transcoded pre-broadcast content to one or more remote apparatus; removing the distribution indicator from the transcoded pre-broadcast content in response to signaling from the network apparatus; distributing the transcoded pre-broadcast content to the one or more remote apparatus based on the distribution indicator being removed.

In an aspect of the disclosure, an apparatus for distributing media, comprising: a transcoder configured to transcode pre-broadcast content into transcoded content according to a format associated with a content distribution apparatus, wherein the transcoded content includes a distribution indicator that restricts distribution of the transcoded content by the content distribution apparatus to one or more remote apparatus; and a transmitter configured to transmit the transcoded content to the content distribution apparatus.

In an aspect of the disclosure, an apparatus for distributing media, comprising: a receiver configured to receive transcoded pre-broadcast content from a network apparatus and receive a signal from a network apparatus, wherein the transcoded pre-broadcast content includes a distribution indicator that restricts distribution of the transcoded pre-broadcast content to one or more remote apparatus; a processor configured to remove the distribution indicator from the transcoded pre-broadcast content in response to the signaling from the network apparatus; a transmitter configured to distribute the transcoded pre-broadcast content to the one or more remote apparatus based on the distribution indicator being removed.

In an aspect of the disclosure, an apparatus for distributing media at a network apparatus comprising: means for transcoding pre-broadcast content into transcoded content according to a format associated with a content distribution apparatus, wherein the transcoded content includes a distribution indicator with the transcoded content to restrict distribution of the transcoded content by the content distribution apparatus to one or more remote apparatus; and means for transmitting the transcoded content to the content distribution apparatus.

In an aspect of the disclosure, an apparatus for distributing media at a content distribution apparatus comprising: means for receiving transcoded pre-broadcast content from a network apparatus, wherein the transcoded pre-broadcast content includes a distribution indicator that restricts distribution of the transcoded pre-broadcast content to one or more remote apparatus; means for removing the distribution indicator from the transcoded pre-broadcast content in response to signaling from the network apparatus; means for distributing the transcoded pre-broadcast content to the one or more remote apparatus based on the distribution indicator being removed.

In an aspect of the disclosure, a computer-readable storage medium comprising one or more programs for execution by one or more processors of an electronic device, the one or more programs includes instructions which, when executed by the one or more processors, cause the electronic device to: transcode pre-broadcast content into transcoded content according to a format associated with a content distribution apparatus; provide a distribution indicator with the transcoded content to restrict distribution of the transcoded content by the content distribution apparatus to one or more remote apparatus; and transmit the transcoded content to the content distribution apparatus.

In an aspect of the disclosure, a computer-readable storage medium comprising one or more programs for execution by one or more processors of an electronic device, the one or more programs includes instructions which, when executed by the one or more processors, cause the electronic device to: receive transcoded pre-broadcast content from a network apparatus, wherein the transcoded pre-broadcast content includes a distribution indicator that restricts distribution of the transcoded pre-broadcast content to one or more remote apparatus; remove the distribution indicator from the transcoded pre-broadcast content in response to signaling from the network apparatus; distribute the transcoded pre-broadcast content to the one or more remote apparatus based on the distribution indicator being removed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
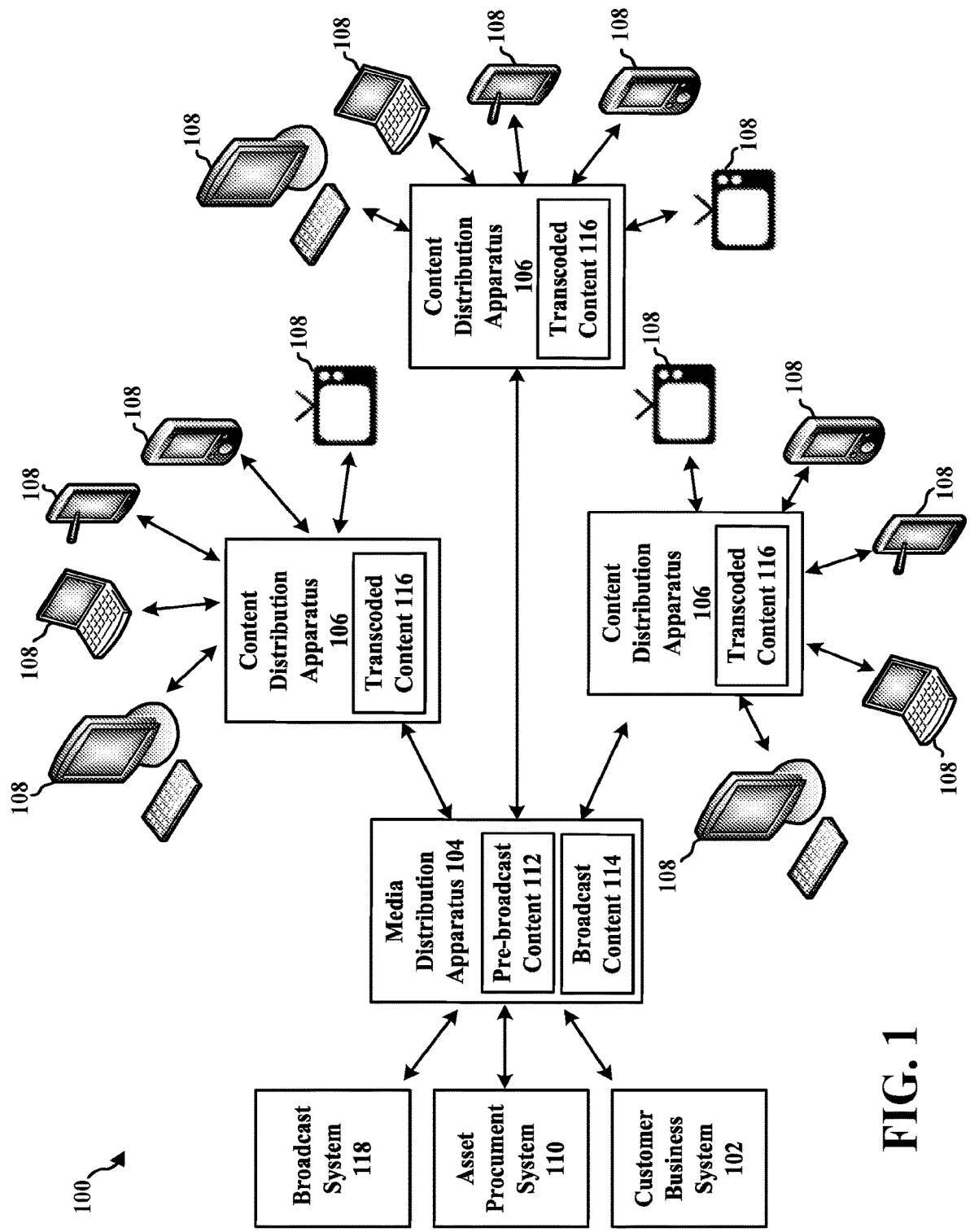
FIG. 1 is a diagram illustrating an example of a time-shifted streaming system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Media content providers such as broadcasters and the service providers that support the broadcast market are seeing significant changes in the number and variety of platforms that need to be accessed in order to reach the existing and new audiences. Often new platforms are non-linear (e.g. time-shifted) and rely on the delivery of broadcast media files that include rich metadata to enable content to be discovered on each platform.

In some time-shifted programs (e.g., VOD, catchup TV) describe recent aired television programs that are no older than seven days old. These time-shifted programs provide audiences the original as-aired program for viewing after the live broadcast has aired. Within the seven days the media content of each television program is considered up-to-date. As such, the provision of time-shifted (e.g., VOD, catchup TV) can be revenue generating or revenue preserving depending on the model of the platform and broadcaster.

Broadcasters may recognize revenue against existing advertisements contained within the linear broadcast stream when viewed on a time-shifted (e.g., VOD, catchup TV) or on-demand platform only when some form of watermark (e.g., Nielsen or Civolution) is present to track and authenticate when a viewer consumes the content on the on demand platform. As such, each view on the on-demand platform may be credited against the original broadcast media for a set period of time after the original transmission. For example, C3 of the Nielsen ratings system allows for credit against views on on-demand platform for three days post original transmission.

In addition to monetizing these views on on-demand platforms, broadcasters face challenges with turnaround time of the on-demand platforms post the initial transmission of a show since the time it takes to transcode and deliver live content suitable for on-demand can eat into the C3 72 hour window. Exploiting the availability of time-shifted (e.g., VOD, catchup TV) for the full 72 hours can have a significant impact in revenue where losing even a few hours can equate to millions of dollars of revenue on an annualized basis.

In some instances, broadcasters, (e.g., national broadcasters) may not rely on credit against advertisements within the time-shifted (e.g., VOD, catchup TV) period. Instead they have a remit to ensure that their audience can consume the programming that would have been on the linear TV channel up to 7 days after transmission. This remit is often enshrined in the broadcasting license given to a national broadcaster or it could be a primary objective of the national broadcaster to stay relevant in a changing technology world to the audience. For example, some broadcasters have adopted policies to retain an audience that is statistically shown to view the majority of their programming on time-shifted (e.g., VOD, catchup TV) or non-linear patterns. While this element of the business case is more problematic to place a value upon, it is a significant driver in the selection of technologies within the playout segment.

Further, some broadcasters may have the commercial rights to content that they produce themselves, which in some instances allows broadcasters to show programming for an extended period beyond the allotted time-shifted (e.g., VOD, catchup TV) window. Often, this extended period is referred to as a library VOD or long tail content. A library VOD may be owned by the content author or studio and may be retained so that these organizations can resell the rights onto other platforms at a later date post broadcast by the broadcaster. In addition, many broadcasters may have only a small percentage of programming that has the correct commercial rights to be used within a VOD library. As such, Library VOD presents a difficult business case for commercialization for the broadcasters and service providers.

As alluded to above, one significant challenge that impacts media content providers such as broadcasters and service providers is in preparing and distributing the time-shifted (e.g., VOD, catchup TV) media to the myriad of platforms used for either commercial or corporate purposes. One approach is to manually record a program by recording the output of the linear TV channel and then to manually segment the program into the transmitted parts. In some instance, the final time-shifted (e.g., VOD, catchup TV) product may include additional media such as promotions/commercials added to the beginning and end slates of the time-shifted file (e.g., VOD, catchup TV). However, it should be appreciated that there are limits on what could be achieved with replacement graphics or different branding.

In another approach, some vendors offer a service whereby the linear stream is recorded and re-segmented based on either manual operations or using segment markers embedded in the linear stream of the time-shifted file (e.g., VOD, catchup TV). Once complete the process may be largely automated, however this system relies on recoding the linear stream (e.g., live broadcast recording) which adds time and risk to the operation.

The present disclosure describes an approach that simplifies the process of producing time-shifted media (e.g., VOD, catchup TV) and reduces the turnaround time of availability of time-shifted media (e.g., VOD, catchup TV) by providing a "pre-pitch" VOD file to platforms ahead of their scheduled transmission time on linear channels. In particular, the present disclosure describes an approach to address the turnaround time issue faced by broadcasters and many national broadcasters. The approach described herein includes a media distribution apparatus to assemble the intended pre-broadcast content, transcode the pre-broadcast, and provide the pre-broadcast to at least one content distribution server prior to a media broadcast. The transcoded pre-broadcast content includes a distribution indicator that prevents the distribution.

The media distribution apparatus further receives the "as-run" broadcast content and subsequently compares the pre-broadcast with the "as-run" broadcast content. Ideally, the "as-run" broadcast content corresponds to the pre-broadcast content (within a tolerance) and the media distribution apparatus may therefore signal the content distribution apparatus to remove the distribution indicator and enable the already transcoded pre-broadcast content to be distributed to one or more remote devices.

In the event that the "as-run" broadcast content does not correspond to the pre-broadcast content (within a tolerance), the media distribution apparatus may determine the differences between the "as-run" broadcast content and the pre-broadcast content and generate and transmit a "delta file" with transcoded content to the content distribution apparatus. The media distribution apparatus or the content distribution apparatus may "cut" and "stitch" the "delta file" with transcoded content. Completion of implementing the "delta file" to the already transcoded pre-broadcast content so that the "as-run" broadcast content corresponds to the pre-broadcast content (within a tolerance) signals the content distribution apparatus to remove the distribution indicator and enable the "stitched" transcoded pre-broadcast content to be distributed to one or more remote devices.

FIG. 1 is a diagram illustrating an example of a time-shifted streaming system. As depicted, streaming system 100 includes customer business system 102 that provides media related assets such as media content (e.g., pre-broadcast files live broadcast output), work-order 202, and the like to media distribution apparatus 104. In an aspect, customer business system 102 may provide media programs and advertisements. In some instances, customer business system 102 may be a network server configured to store media content and deliver media content to media distribution apparatus 104. In an aspect, customer business system 102 may provide a schedule of upcoming programs as well as metadata that associates advertisement media to be inserted at specific timestamps for each program.

As depicted, asset procurement system 110 couples to media distribution apparatus 104. In an aspect, asset procurement system 110 may provide media content as well as one or more assets (e.g., graphics, audio/video, watermarks, ad-splicing messages) to media distribution apparatus 104.

Media distribution apparatus 104 may receive media content from customer business system 102 and/or media content as well as one or more assets (e.g., graphics, audio/video, watermarks, ad-splicing messages) from asset procurement system 110. In an aspect, media distribution apparatus 104 may record a program by recording the output of the linear TV channel from customer business system 102 and store the file as an as-run asset or program. In some instances, media distribution apparatus 104 may transcode the as-run asset into multiple formats associated with a platform and transmit the corresponding transcoded media file to content distribution apparatus 106 for ingestion. Media distribution apparatus 104 may also associate a watermark with the corresponding transcode file. In an aspect, the watermark may be part of a file with corresponding metadata for the transcoded file.

In a further aspect, media distribution apparatus 104 may assemble each asset in accordance to work-order 202. As such, media distribution apparatus 104 may transcode the pre-broadcast content 112 into transcoded content 116 according to a format associated with a content distribution apparatus 106. In addition, media distribution apparatus 104 may provide a distribution indicator (e.g., embargo flag) with the transcoded content 116 to restrict distribution of the transcoded content 116 by the content distribution apparatus 106 to one or more remote apparatus 108 (e.g., TV, mobile device, tablet, etc.). In addition, and media distribution apparatus 104 may transmit the transcoded content 116 to the content distribution apparatus 106 for ingestion on the platform.

In an aspect, media distribution apparatus 104 may further receive broadcast content 114. In addition, media distribution apparatus 104 may determine that the pre-broadcast content 112 corresponds to the broadcast content 114. In addition, media distribution apparatus 104 may signal the content distribution apparatus to remove the distribution indicator (e.g., embargo flag) to the transcoded content 116 to permit the distribution of the transcoded content 116 by the content distribution apparatus to one or more remote apparatus 108 (e.g., TV, mobile device, tablet, etc.) based on the determination that the pre-broadcast content 112 corresponds to the broadcast content 114.

In an aspect, the determination that media distribution apparatus 104 that the pre-broadcast content 112 corresponds to the broadcast content 114 comprises determining that the pre-broadcast content 112 and the broadcast content 114 correspond to one another within a tolerance.

In an aspect, media distribution apparatus 104 may further determine that the pre-broadcast content 112 does not correspond to the broadcast content 114. In addition, media distribution apparatus 104 may determine one or more differences between the pre-broadcast content 112 and the broadcast content 114. In addition, media distribution apparatus 104 may transcode data identifying the one or more differences. Finally, media distribution apparatus 104 may transmit the data to the content distribution apparatus.

In an aspect, the determination whether the pre-broadcast content 112 corresponds to broadcast content 114 is based on a run log of the pre-broadcast content 112 and a run log of the broadcast content 114.

In an aspect, the transcoded content 116 includes metadata and the distribution indicator is provided in the metadata. In an aspect, signaling the content distribution apparatus comprises transmitting metadata configured to remove the distribution indicator.

As described above, the time-shifted media (e.g., VOD, catchup TV) file may be a transcoded version of a media file that is segmented at various time intervals for advertisement media content. The contents of the VOD file may include the aired program media, graphics, audio/video, watermarks, and ad-splicing messages. As such, the pre-pitched VOD file may be conceptualized as a recipe with ingredients (e.g., assets) that may be assembled prior to the broadcast based on the anticipated to-be-aired program in its entity. That is, to the pre-pitched VOD file is derived from a work-order that includes assets such as a broadcast master (e.g., to-be-aired program), graphics, audio/video, watermarks, ad-splicing messages be assembled and then transcoded to create "pre-pitched" the time-shifted media (e.g., VOD, catchup TV) file substantially similar to the to-be-aired program. This simplifies and makes repeatable and reliable to production of assets. This also facilitates scalability to customers to scale their operations to meet the opportunity of new time-shifted media (e.g., VOD, catchup TV) platforms without growing operational costs in-line.

In addition, the pre-pitch allows broadcasters to produce on-demand assets many hours ahead of the scheduled linear playback time and to have these uploaded to the platforms ready for consumption by viewers as soon as the linear broadcast is complete. This pre-pitch reduces turnaround time and wins back lost hours of time-shifted media (e.g., VOD, catchup TV) viewing for broadcasters which are often monetized through the use of watermarking technologies from Nielsen, Civolution and other such companies.

Figure 2:
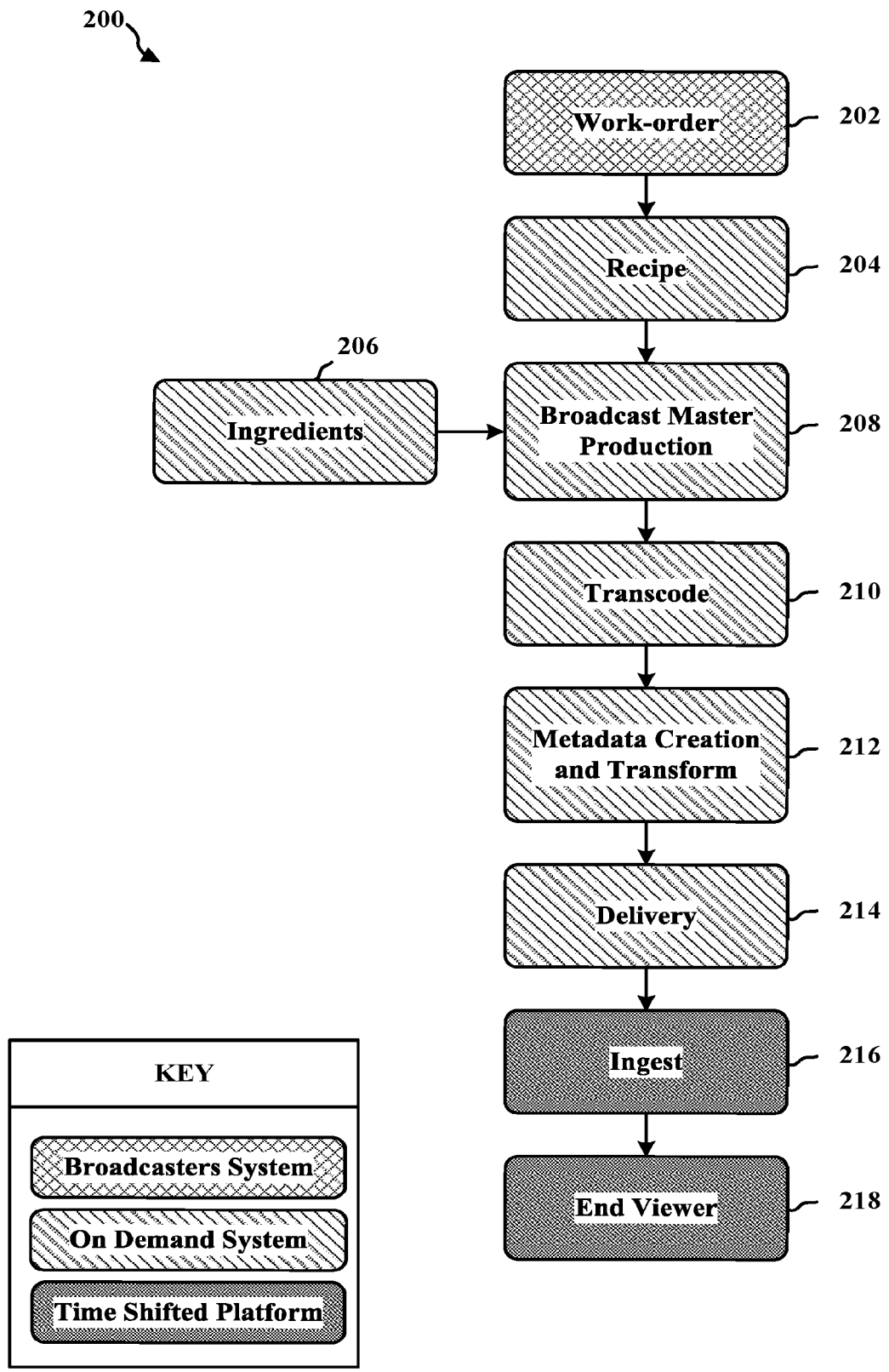
FIG. 2 is a diagram illustrating a work flow diagram of the generation and delivery of pre-pitched VOD file to an end viewer.

FIG. 2 is a diagram illustrating a work flow diagram of the generation and delivery of pre-pitched VOD file to an end viewer. As depicted, the workflow that drives the pre-pitch starts with work-order 202 from a customer business system 102, a trigger from a media distribution apparatus 104 or a manual command from an operator. In an aspect, work-order 202 may include mandatory fields and optional fields for variables in the pre-pitch workflow such as required by date, schedule time of linear transmission (enables insertion of a watermark), and a link to an media distribution apparatus 104 linear playout channel/schedule file.

It should be appreciated, that once the work-order 202 is raised within the media distribution apparatus 104, the completion of the on-demand file is dependent on the media assets or ingredients 206 (e.g., graphics, audio/video, watermarks, ad-splicing messages) being available and ready for air. Whereas, in a linear workflow, advertisement firms have secured the assets for customer business system 102 and awaits the time of transmission before playback would commence.

In on-demand workflow 200, once all assets are complete and ready the pre-pitch workflow may commence ahead of the scheduled transmission time. The processing of the pre-pitched job starts with the creation and/or delivery of a broadcast master. In an aspect, the broadcast master includes metadata. In some instances the metadata may include segment markers embedded in the broadcast master to indicate time intervals for advertisement locations. In an aspect, the broadcast master is a high resolution broadcast file that contains all of the media referenced by work-order 202 and is created according to recipe 204. In an aspect, the broadcast master may also contain watermarks such as Nielsen who have a C3 and C7 watermarking scheme and Civolution Next guard. It should be appreciated that several watermarking schemes may be used. In addition, it should be recognized that the method implemented for each watermark may be specific to each watermarking technology. For example, some technologies provide for a watermark being added to the on-demand asset so that it appears that the asset is time stamped with the intended time of transmission even though the asset (e.g. pre-pitched VOD file) may have been produced earlier. That is, an asset (e.g. pre-pitched VOD file) produced at 4 pm may have the deliverable asset watermark that shows the 8 pm of the intended transmission time.

Recipe 204 details the format, resolution and technical parameters of the on-demand asset (e.g. pre-pitched VOD file) to be produced. In addition, recipe 204 details the use of the range of Plugins within the media distribution apparatus 104 to add secondary assets such as graphics, stills, logos and other media to build the sequence that will be transmitted on the linear playout hours later.

Once the production of the broadcast master 208 is complete the on demand asset (e.g. pre-pitched VOD file) may be transcoded 210 to its final delivery format in a faster than real-time operation and indeed this may to be multiple target formats in parallel. That is, the transcoded broadcast may be provided to one or more content distribution apparatus 106 prior to the real-time production and each content distribution apparatus 106 may be of a different format. In an aspect, the media distribution apparatus 104 generates the accompanying metadata once the on-demand (e.g. pre-pitched VOD file) is complete. In some instances, the metadata may be provided as a separate metadata XML file. In an aspect, the metadata file includes a distribution indicator (e.g., an embargo flag, FIG. 3). In an aspect, the distribution indicator is set by the media distribution apparatus 104 to indicate that the asset (e.g. pre-pitched VOD file) is not available to be delivered to the consumers on the time-shifted (e.g., VOD, catchup TV) platforms. In an aspect, the distribution indicator may only be lifted by the media distribution apparatus 104.

Referring back to FIG. 2, the on-demand assets (e.g. pre-pitched VOD file) and the metadata are then transferred (e.g., delivery 214) over an IP connection using FTP/SFTP or delivery acceleration technology to the content distribution apparatus 106 (e.g., platform) through which the viewers will consume the assets (e.g. pre-pitched VOD files). The content distribution apparatus 106 (e.g., platform) will commence ingest 216 of the delivered on-demand assets (e.g. pre-pitched VOD files) and associated metadata. In some instances, this process may take many hours according to the service level agreement provided by the content distribution apparatus 106 (e.g., platform). It should be recognized that although the content distribution apparatus 106 (e.g., platform) may ingest the assets (e.g. pre-pitched VOD files) and metadata each must observe the distribution indicator (e.g., an embargo flag, FIG. 3) within the metadata. As such, content distribution apparatus 106 (e.g., platform) may not make the asset (e.g. pre-pitched VOD file) "live" and viewable by consumers on the platform until this distribution indicator is unset by the media distribution apparatus 104.

One way for media distribution apparatus 104 to unset the distribution indicator on the On-demand is for an operator to manually search for the on-demand job within the media distribution apparatus 104 and manually unset the distribution indicator, which may be promulgated to the content distribution apparatus 106 (e.g., platform).

Another way for media distribution apparatus 104 to unset the distribution indicator on the media distribution apparatus 104 to notify an operator via a workflow to review the on-demand asset (e.g. pre-pitched VOD file) status at the time of the linear transmission to confirm that no changes were made to the linear playout. The operator may then manually unset the distribution indicator, which may be promulgated to the content distribution apparatus 106 (e.g., platform).

Another way for media distribution apparatus 104 to unset the distribution indicator on the on-demand is for the media distribution apparatus 104 to link with a playout channel and use a comparison of a as-run-log from the linear playout and the as-stitched-log from the broadcast master 208 process to identify if the linear playout corresponds to the pre-pitched on-demand asset (e.g. pre-pitched VOD file).

For example, in this approach the on-demand comparison engine may take as stitched logs produced by the media distribution apparatus 104 as a real-time process and compares them to the linked linear playout channel specified in work-order 202. The on-demand comparison engine further checks the sequenced events to ensure that each on-demand asset (e.g. pre-pitched VOD file) corresponds to the linear channel transmission and that the inserted watermark matches the linear channels time of transmission. In an aspect, the on-demand comparison engine may account for a configurable tolerance of error. For example, the error tolerance may take into account the watermarking timestamps in addition to any logic applied to exclude certain events in the linear playout from the on-demand asset (e.g. pre-pitched VOD file), such as alternate graphics within the on-demand asset (e.g. pre-pitched VOD file) compared to the linear broadcast.

Once the on-demand comparison engine determines that each on-demand asset (e.g. pre-pitched VOD file) corresponds to the linear channel transmission, the media distribution apparatus 104 may unset the distribution indicator (e.g., an embargo flag, FIG. 3) removed by the re submission of the on-demand metadata to the catch up platform which then may switch the asset (e.g. pre-pitched VOD file) "live" without further delay.

In the event that the comparison of the as-stitch-logs and as-run-logs reveal a correspondence failure to match the distribution indicator (e.g., an embargo flag, FIG. 3) remains set on the program with the time-shifted (e.g., VOD, catchup TV) platform. As such, a re-submission of on-demand work-order may be triggered to remake the on-demand asset (e.g. pre-pitched VOD file). Once complete the asset (e.g. pre-pitched VOD file) is republished to the time-shifted (e.g., VOD, catchup TV) platform, with the distribution indicator unset making it available for end viewer consumption.

In an aspect, the on-demand comparison engine may check the sequenced events in real-time and dynamically trigger on-demand asset (e.g. pre-pitched VOD file) stitching anytime a change is triggered on the linear playback. That is, on-demand comparison engine may compare as-run-log from the linear playout on the fly to the as-stitched-log from the broadcast master 208 process. For example, this may be realized by only acting on the changes and "re-stitch" the content in "delta file" to the pre-broadcast content. Another approach may be to I-Frame all media (e.g., broadcast master and on-demand asset) at clip boundaries. This would provide quick content replacement to the broadcast master and the resulting on-demand assets (e.g. pre-pitched VOD files), either on premise or in the cloud. The watermarking will need to be regenerated for the modified sections of the assets (depending on the watermarking technology in use, the watermark for the entire asset may need to be regenerated).

Figure 3:
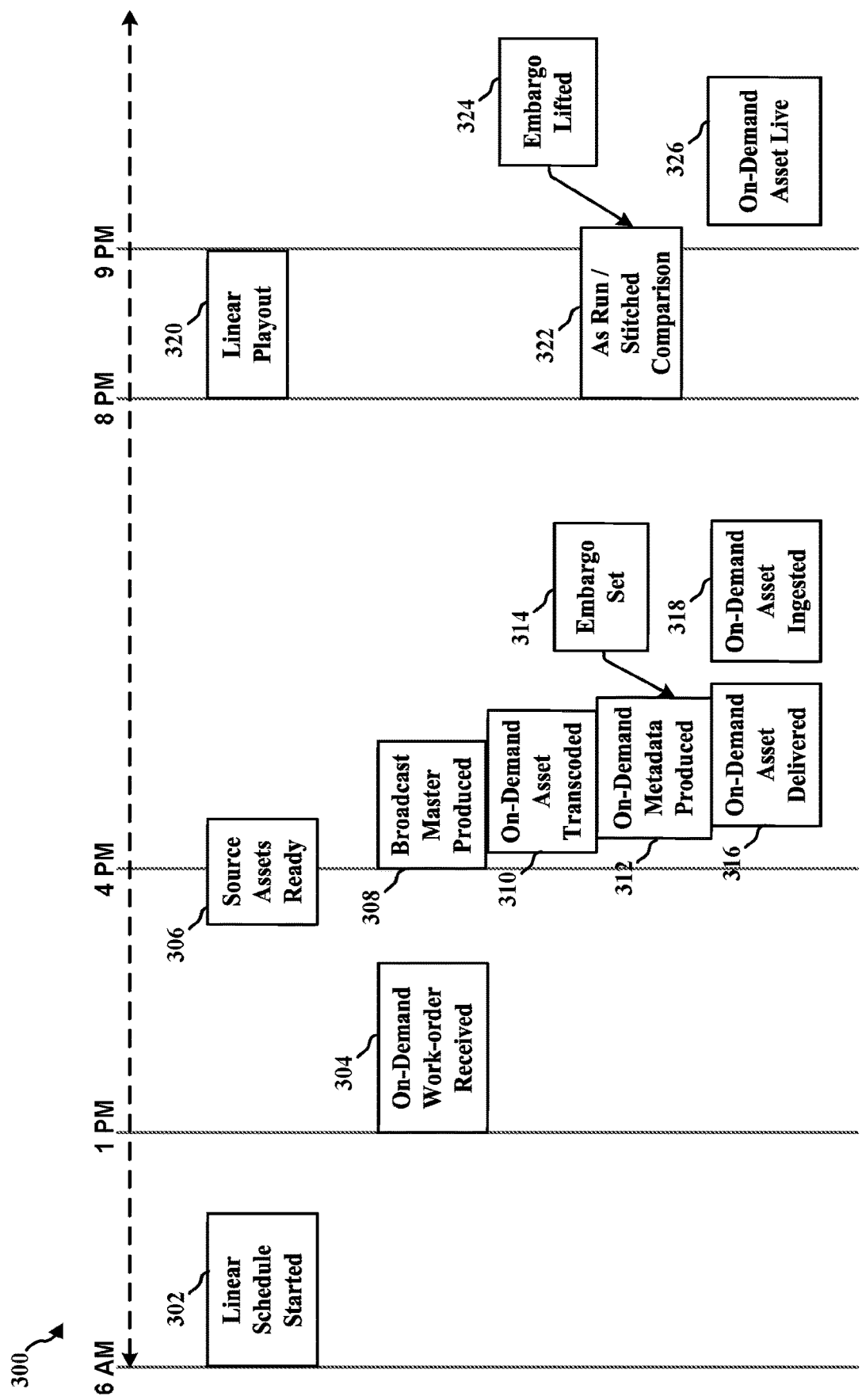
FIG. 3 is a diagram illustrating an example of a pre-pitched work flow timeline where the as-run-log from the linear playout corresponds to the as-stitched-log.

FIG. 3 is a diagram illustrating an example of a pre-pitched work flow timeline where the as-run-log from the linear playout corresponds to the as-stitched-log. As depicted at 6 AM the linear schedule 302 is started. At 1 PM media distribution apparatus 104 receives the on-demand work-order 304 (e.g., workflow) from customer business system 102. Once workflow is received 304 media distribution apparatus 104 requests assets from customer business system 102 and asset procurement system 110. At 4 PM media distribution apparatus 104 has received the last source assets 306 from customer business system 102 and asset procurement system 110.

Media distribution apparatus 104 assembles and orders the assets in accordance with work-order 202 and produces broadcast master 308. Upon completion of producing broadcast master 308 media distribution apparatus 104 transcodes 310 the as-run asset into multiple formats associated with a platform. In addition, media distribution apparatus 104 produces on-demand metadata 312. In some instances, media distribution apparatus 104 may include watermark as part of a file with corresponding metadata for the transcoded file. In addition, media distribution apparatus 104 places the distribution indicator 314 (e.g., embargo set) on the on-demand assets or as part of the metadata associated with the distribution indicator (e.g., embargo set). Following the distribution indicator 314 (e.g., embargo flag) being set, media distribution apparatus 104 transmits the on-demand asset 316 to content distribution apparatus 106 for each respective platform. In turn, each content distribution apparatus 106 begins to ingest 318 the on-demand asset for availability. As depicted, the process occurs well ahead of the linear playout 320 between 8-9 PM.

Just prior to 8 PM, media distribution apparatus 104 links with a playout channel and begins recording the linear playout 320 and saves the file as-run. In some instances, the on-demand comparison engine of media distribution apparatus 104 may check the sequenced events in real-time and dynamically trigger on-demand asset stitching anytime a change is triggered on the linear playback. Immediately following linear playout 320 the as-run recording is stopped and the on-demand comparison engine of media distribution apparatus 104 compares the as-run-log from the linear playout on the fly to the as-stitched-log 322. In this case, the on-demand comparison engine of media distribution apparatus 104 determines correspondence within an acceptable error tolerance and signals the content distribution apparatus 106 to remove the distribution indicator (e.g., embargo flag) 324. With the distribution indicator (e.g., embargo flag) removed the on-demand asset is available live for consumption.

Figure 4:
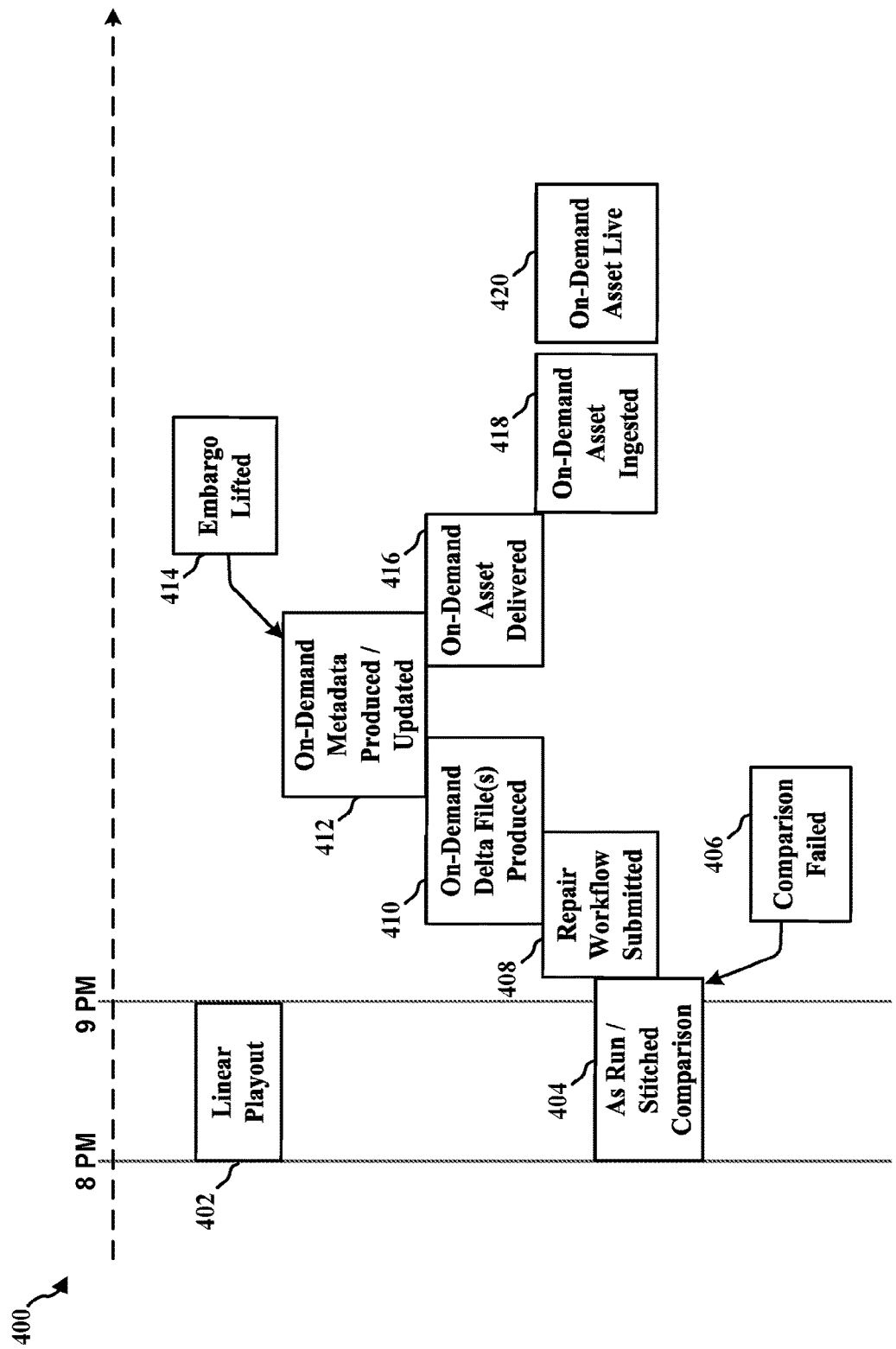
FIG. 4 is a diagram illustrating an example of a pre-pitched work flow timeline where the as-run-log from the linear playout does not corresponds to the as-stitched-log.

FIG. 4 is a diagram illustrating an example of a pre-pitched work flow where the as-run-log from the linear playout does not corresponds to the as-stitched-log. In this scenario it is possible that the network broadcast change an advertisement at the last minute. As such, the work-flow prior to 9 PM is the same as in FIG. 3. That is, immediately following linear playout 402, the as-run recording is stopped and the on-demand comparison engine of media distribution apparatus 104 compares the as-run-log from the linear playout on the fly to the as-stitched-log 404. In this case, the on-demand comparison engine of media distribution apparatus 104 determines that the as-run-log from the linear playout 402 does not correspond to the as-stitched-log. Media distribution apparatus 104 submits a repair 408 for the on-demand asset and determines the produces a delta file 410 to account for the differences in the content between the as-run-log and the as-stitched-log.

Once the differences are determined and the delta file is produced, one approach is for media distribution apparatus 104 to begin regenerating the content via stitching of the "deltas." At which, the metadata is produced and/or updated 412 and the distribution indicator (e.g., embargo flag) 324 is removed 414 from the content distribution apparatus 106. At that point, the updated content is then retransmitted to content distribution apparatus 106 to replace existing content. Afterwards, the media distribution apparatus 104 engine may re-stitch the content 416. Once the files have been update on the content distribution apparatus 106 the platform begin the ingest the updated on-demand assets 418

Another approach is to integrate a media distribution apparatus 104 engine with the content distribution apparatus 106, and transmit only the "delta file" and instructions 412. At that point, the updated content is then retransmitted to content distribution apparatus 106 to replace existing content. Afterwards, the media distribution apparatus 104 engine may re-stitch the content. Once the files have been updated on the content distribution apparatus 106 the distribution indicator (e.g., embargo flag) 324 is removed 414. Subsequently, the "as-stitched" pre-broadcast content is delivered 416. After which, the "as-stitched" pre-broadcast content is ingested 418 and live 420.

Figure 5:
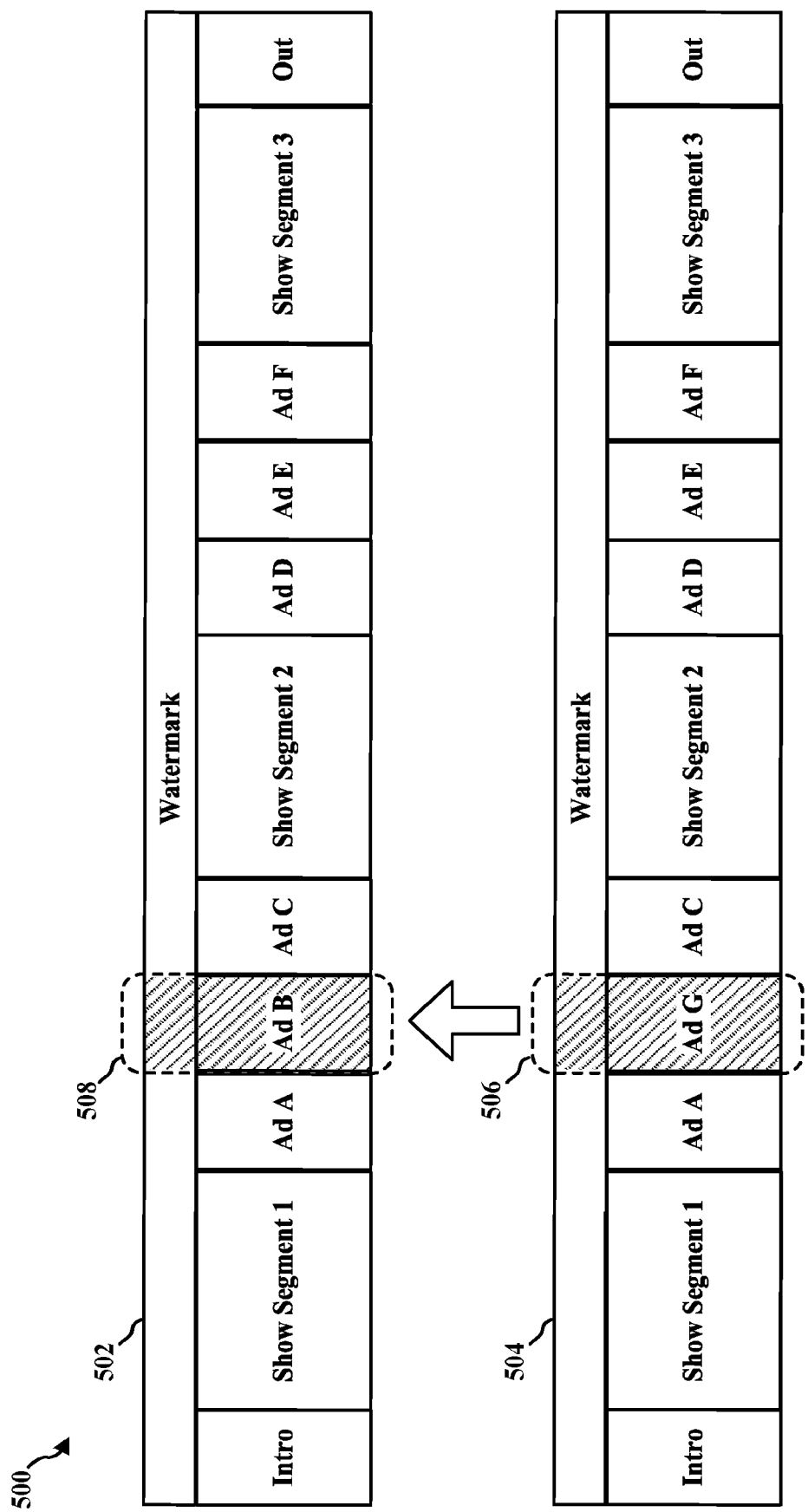
FIG. 5 is a diagram illustrating an example of a technique of recreating the content by re-stitching "as-run" broadcast content to the pre-broadcast content.

FIG. 5 is a diagram illustrating an example of a technique of recreating the content by re-stitching "as-run" broadcast content to the pre-broadcast content. In this instance, the content providers may have changed Ad B 508 with Ad G 506 prior to broadcast. As depicted, media distribution apparatus 104 determines the timestamps in the as-run-log 502 and cuts the portion of the playout corresponding to Ad B 508, transcodes the Ad G 508 and stitches it into the on-demand asset in the location corresponding to Ad B 506.

Figure 6:
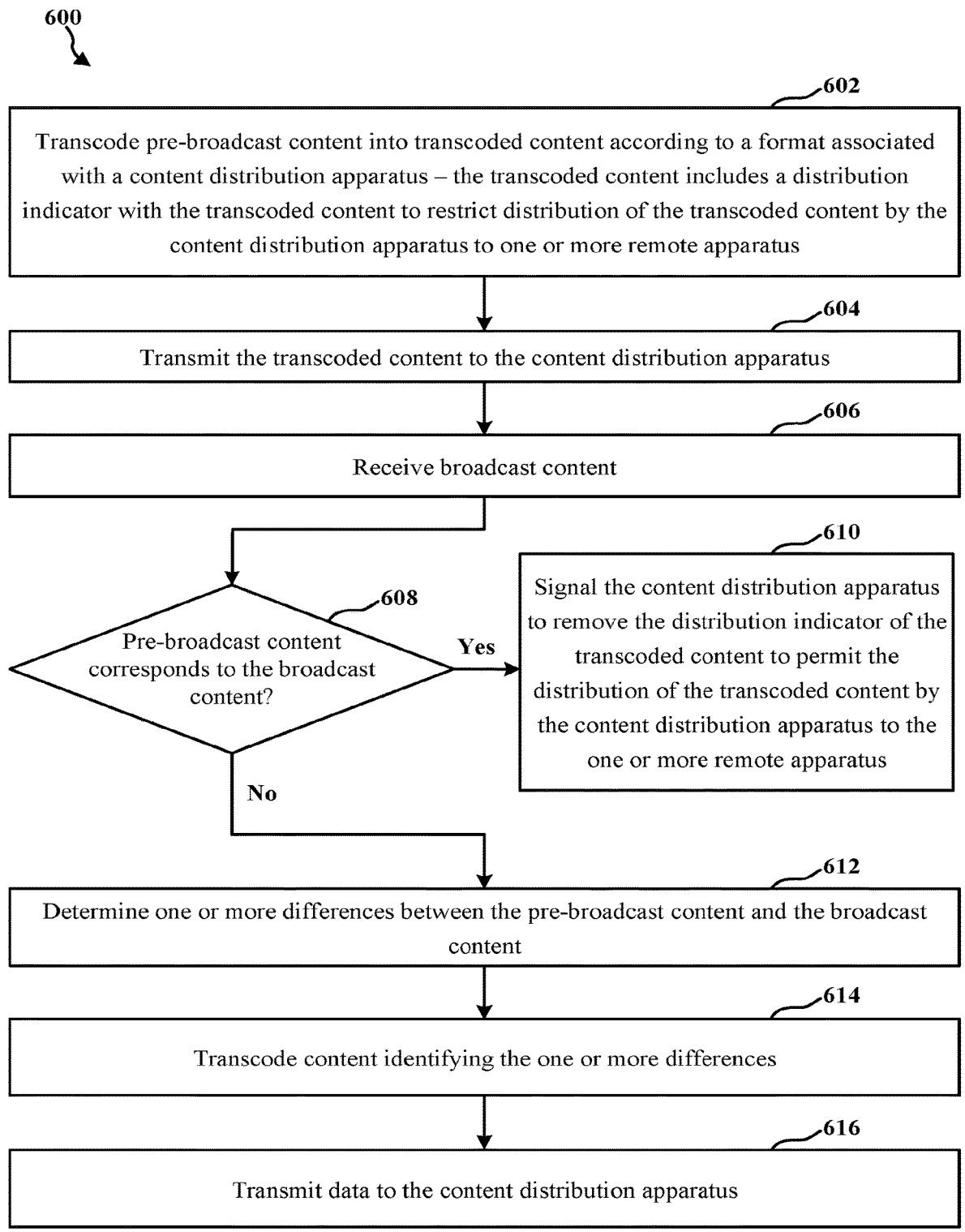
FIG. 6 is a flowchart of a method of distributing media at a network apparatus.

FIG. 6 is a flowchart of a method of distributing media at a media distribution apparatus 104. The media distribution apparatus 104 may be a network server that is configured to receive pre-broadcast content from asset procurement system 110 and customer business system 102. For example, media distribution apparatus 104 may receive the pre-broadcast video in a high definition format as well as advertisement segments such as graphics, audio/video, watermarks, ad-splicing messages, and the like. In addition the pre-broadcast content may include instructions for how to "stitch" the pre-broadcast content together to correspond to the intended "as-run" broadcast content.

Media distribution apparatus 104 may be configured to receive live broadcast content from broadcast system 118. That is, media distribution apparatus 104 may record the "as-run" broadcast and store the "as-run" broadcast to a hard drive or other computer-readable media. Alternatively, the network apparatus may receive the "as-run" file from a server on the broadcast system 118.

In an aspect, at block 602, the media distribution apparatus 104 transcodes pre-broadcast content into transcoded content according to a format associated with a content distribution apparatus. The transcoded content includes a distribution indicator with the transcoded content to restrict distribution of the transcoded content by the content distribution apparatus to one or more remote apparatus. For example, the media distribution apparatus 104 may transcode the pre-broadcast content into MPEG-2 format and include distribution indicator in metadata associated with the MPEG-2 file that prevents distribution and/or video viewing (e.g., playing the video).

In an aspect, at block 604, the media distribution apparatus 104 transmits the transcoded content to the content distribution apparatus 106. For instance, the network apparatus may be server that uploads transcoded pre-broadcast video content to a content distribution server with the distribution indicator applied to restrict the content distribution server from enabling downloading or streaming of the video content. In some configurations, the transcoded content includes metadata. In some configurations the distribution indicator is provided in the metadata.

In an aspect, at block 606, the media distribution apparatus 104 receives broadcast content. The media distribution apparatus 104 may record the "as-run" broadcast content and store the "as-run" broadcast or otherwise receive the "as-run" file from a server on the broadcast system 118. This may include receiving the watermark of the "as-run" broadcast content.

In an aspect, at block 608, the media distribution apparatus 104 determines whether the pre-broadcast content corresponds to the broadcast content. In some configurations this may include determining that the pre-broadcast content corresponds to the broadcast content comprises determining that the pre-broadcast content and the broadcast content correspond to one another within a tolerance. In some configurations, determining whether the pre-broadcast content corresponds to broadcast content is based on a run log of the pre-broadcast content and a run log of the broadcast content.

In an aspect, at block 610, the media distribution apparatus 104 signals the content distribution apparatus to remove the distribution indicator of the transcoded content to permit the distribution of the transcoded content by the content distribution apparatus to the one or more remote apparatus based on the determination that the pre-broadcast content corresponds to the broadcast content. In some instance, signaling the content distribution apparatus 106 comprises transmitting metadata configured to remove the distribution indicator. For example, the metadata may include instructions to remove the distribution indicator.

In some instances, the media distribution apparatus 104 may determine that the pre-broadcast content does not correspond to the broadcast content. In such an aspect, at block 612, media distribution apparatus 104 further determine one or more differences between the pre-broadcast content and the broadcast content. For example, the broadcasters may have replaced an advertisement with another at the last minute. As such, the "as-run" broadcast content may include an advertisement that is not included in the pre-broadcasted content.

In an aspect, at block 614, media distribution apparatus 104 transcodes data identifying the one or more differences for transmission to the content distribution apparatus. For example, the media distribution apparatus 104 may determine that the "as-run" broadcast content includes advertisement "Ad G" that should replace "Ad B" in the pre-broadcast content as depicted in FIG. 5. As such, the media distribution apparatus 104 may transcode the "Ad G" segment and determine the location where the transcoded "Ad G" segment should be placed in the transcoded pre-broadcast content.

In an aspect, at block 616, media distribution apparatus 104 transmitting data to the content distribution apparatus 106. For example, the transcoded "Ad G" segment and the location where the transcoded "Ad G" segment should be placed is placed in a "delta file." In some configurations the data content includes metadata. In some instances, the "delta file" may be included in the metadata. In some configurations, the metadata may signal the content distribution apparatus 106 to remove the distribution indicator once the content distribution apparatus 106 completes modifications to the pre-broadcast content.

Figure 7:
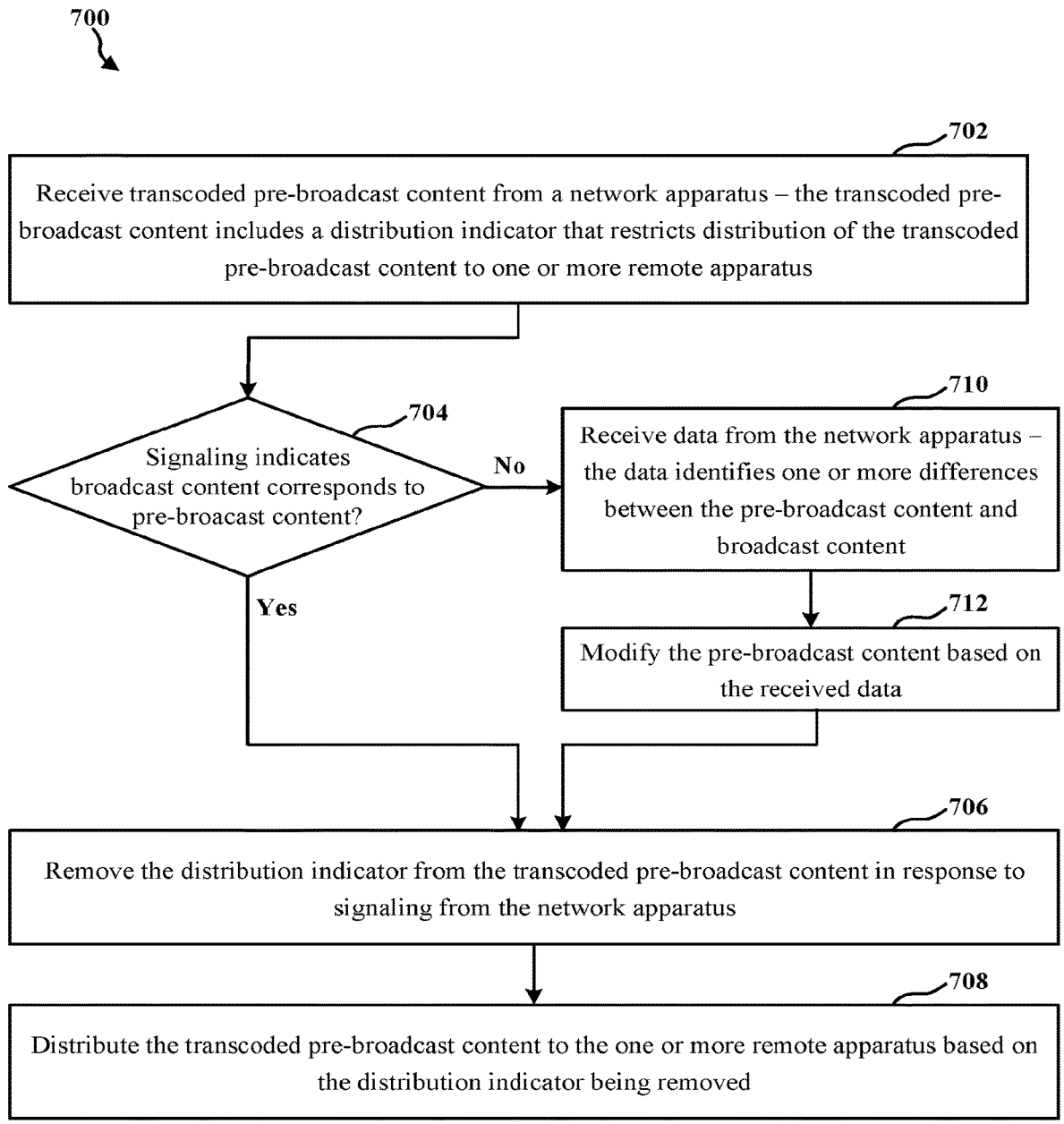
FIG. 7 is a flowchart of a method of distributing media at a content distribution apparatus.

FIG. 7 is a flowchart of a method of distributing media at a content distribution apparatus 106. The media distribution apparatus 104 may be a network server that is configured to receive pre-broadcast content from media distribution apparatus 104.

In an aspect, at block 702 the content distribution apparatus 106 receives transcoded pre-broadcast content from a network apparatus. The transcoded pre-broadcast content includes a distribution indicator that restricts distribution of the transcoded pre-broadcast content to one or more remote apparatus. For example, the transcoded pre-broadcast content may include a metadata file that includes a distribution indicator.

In an aspect, at block 704 the content distribution apparatus 106 determines whether the signaling from the media distribution apparatus 104 indicates that the broadcast content corresponds to pre-broadcast content. For example, the transcoded pre-broadcast content may include a metadata file and the metadata may signal that the broadcast content corresponds to pre-broadcast content.

In an aspect, at block 706 the content distribution apparatus 106 removes the distribution indicator from the transcoded pre-broadcast content in response to signaling from the network apparatus. For example, the metadata may indicate that the broadcast content corresponds to the pre-broadcast content and include instructions to remove the distribution indicator.

In an aspect, at block 708 the content distribution apparatus 106 distributes the transcoded pre-broadcast content to the one or more remote apparatus based on the distribution indicator being removed. That is, the metadata may include instructions to remove the distribution indicator based on the broadcast content corresponding to the pre-broadcast content or modification to pre-broadcast content to align the pre-broadcast content with the broadcast content. Once the distribution indicator is removed the modified or unmodified transcoded is live and available for streaming and/or download.

At block 704 the content distribution apparatus 106 may determine that the signaling from the media distribution apparatus 104 indicates that the broadcast content corresponds to pre-broadcast content. In this instance, at block 710 the content distribution apparatus 106 receives data from the network apparatus and the data identifies one or more differences between the pre-broadcast content and broadcast content. In some configurations, the metadata may include a "delta file" that identifies the one or more differences between the pre-broadcast content and broadcast content.

In an aspect, at block 710 the content distribution apparatus 106 modifies the pre-broadcast content based on the data. For example, the metadata may include "delta file" that identifies the one or more differences between the pre-broadcast content and broadcast content and instruction on where to modify the transcoded pre-broadcast content.

Figure 8:
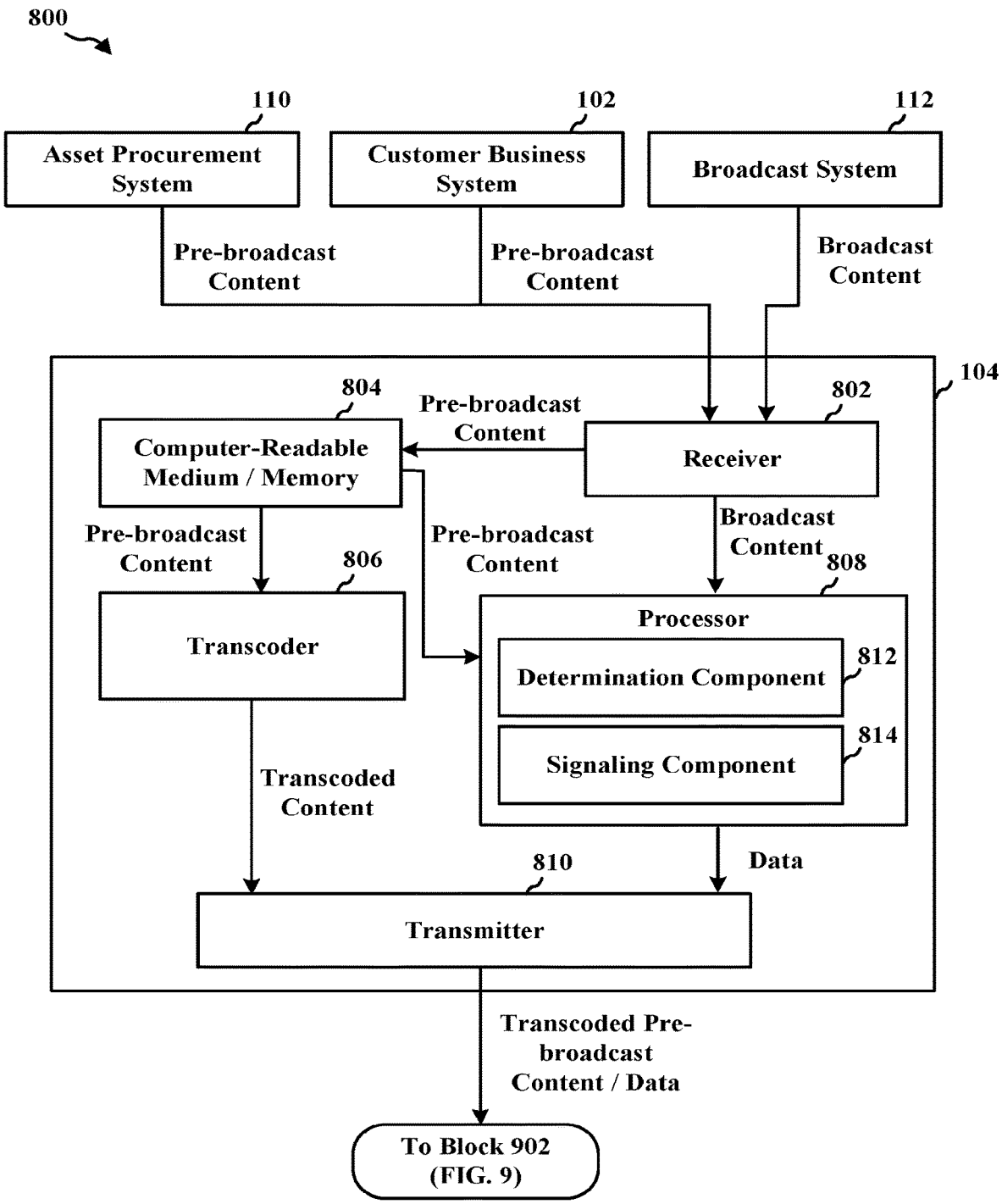
FIG. 8 conceptual data flow diagram illustrating the data flow between different means/components in a network apparatus.

FIG. 8 conceptual data flow diagram illustrating the data flow between different means/components in a media distribution apparatus 104. The media distribution apparatus 104 may be a network server. The media distribution apparatus 104 includes receiver 802, computer readable medium/memory 804, transcoder 806, processor 808, and transmitter 810. Processor 808 further includes a determination component 812 and a signaling component 814. In one aspect, transcoder 806 is configured to transcode content according to a format associated with a content distribution apparatus. The transcoded content may include a distribution indicator with the transcoded content to restrict distribution of the transcoded content by the content distribution apparatus 106 to one or more remote apparatus. The transmitter 810 is configured to transmit the transcoded content to the content distribution apparatus 106.

In one configuration, the receiver 802 is configured to receive pre-broadcast content from asset procurement system 110 and from customer business system 102 and is further configured to receive broadcast content from broadcast system 118. In such a configuration, the processor 808, particularly, determination component 812 is configured to determine whether the pre-broadcast content corresponds to the broadcast content. Further, processor 808, particularly, signaling component 814 is configured to signal the content distribution apparatus to remove the distribution indicator of the transcoded content to permit the distribution of the transcoded content by the content distribution apparatus to the one or more remote apparatus based on a determination that the pre-broadcast content corresponds to the broadcast content. One addition to such a configuration, the processor 808, particularly, determination component 812 is further configured to determine that the pre-broadcast content and the broadcast content correspond to one another when the pre-broadcast content and the broadcast content correspond to one another within a tolerance. An alternate addition to such a configuration, processor 808, particularly, determination component 812 is configured to determine whether the pre-broadcast content corresponds to broadcast content is based on a run log of the pre-broadcast content and a run log of the broadcast content. Another alternate addition to such a configuration, processor 808, particularly, signaling component 814 is configured to signal the content distribution apparatus. That is, signaling component 814 is configured to include instruction in metadata to remove the distribution indicator and transmitter 810 is further configured to transmit the metadata to content distribution apparatus 106. In one configuration, the processor 808, particularly, determination component 812 is further configured to determine whether the pre-broadcast content does not correspond to the broadcast content. In this configuration, processor 808, particularly, determination component 812 is configured to determine one or more differences between the pre-broadcast content and the broadcast content based on a determination that the pre-broadcast content does not correspond to the broadcast content. Further, transcoder 806 is configured to transcode data that identifies the one or more differences for transmission to the content distribution apparatus. Further, transmitter 810 is configured to transmit the data to the content distribution apparatus. In one configuration, transcoder 806 is configured to transcode content that includes metadata. In one configuration, transcoder 806 provides the distribution indicator in the metadata.

Figure 9:
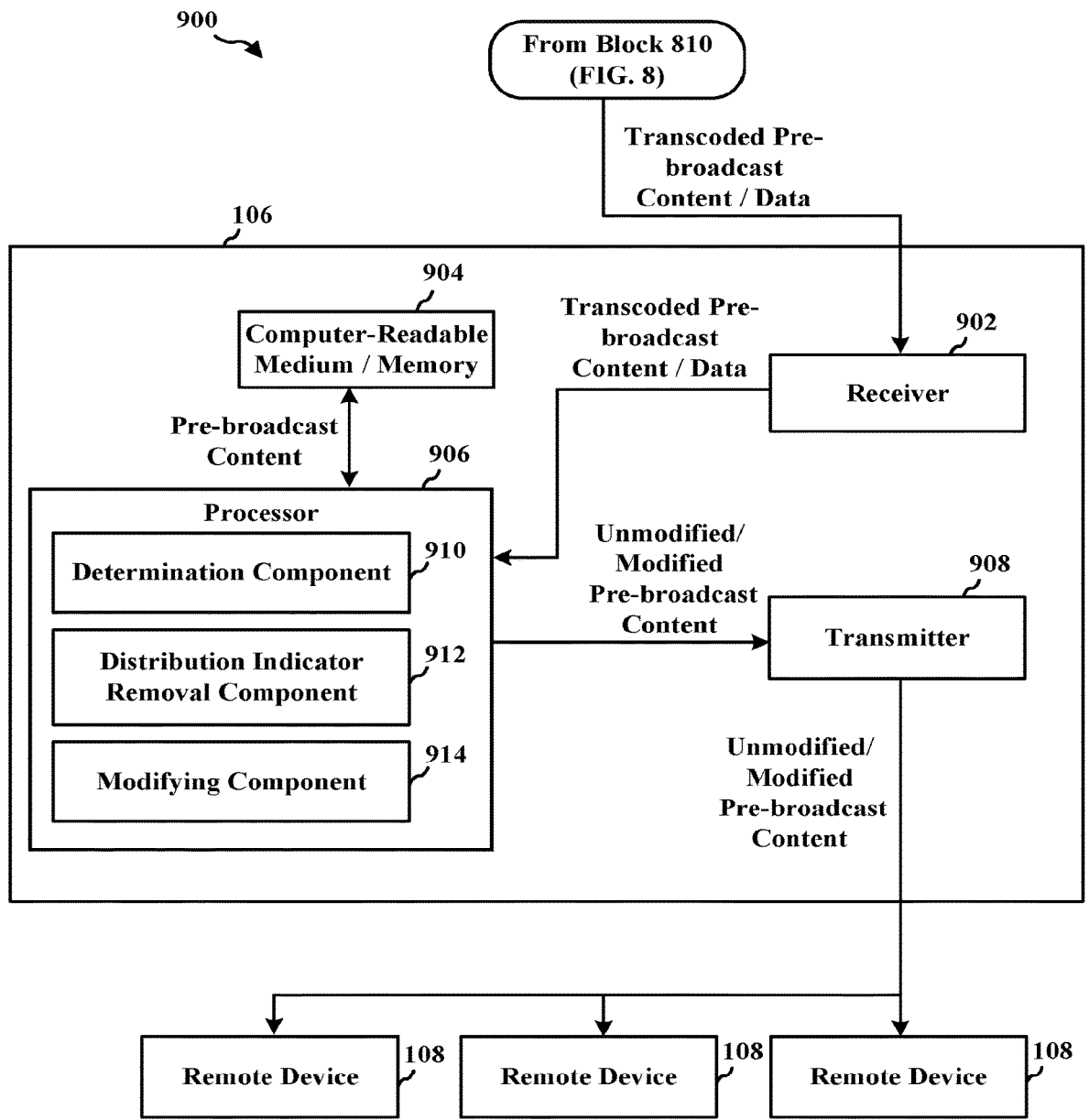
FIG. 9 conceptual data flow diagram illustrating the data flow between different means/components in a content distribution apparatus.

FIG. 9 conceptual data flow diagram illustrating the data flow between different means/components in a content distribution apparatus 106. The content distribution apparatus 106 may be a network server. The content distribution apparatus 106 includes receiver 902, computer readable medium/memory 904, processor 906, and transmitter 908. Processor 906 further includes a determination component 910, a distribution indicator removal component 912, and a modifying component 914. In one aspect, receiver 902 is configured to receive transcoded pre-broadcast content from a media distribution apparatus 104. In this configuration, the transcoded pre-broadcast content includes a distribution indicator that restricts distribution of the transcoded pre-broadcast content to one or more remote apparatus. Processor 906, particularly, distribution indicator removal component 912 is configured to remove the distribution indicator from the transcoded pre-broadcast content in response to signaling from the network apparatus. Transmitter 908 is configured to distribute the transcoded pre-broadcast content to the one or more remote apparatus based on the distribution indicator being removed.

In one configuration, receiver 902 is configured to receive data from the network apparatus. The data identifies one or more differences between the pre-broadcast content and broadcast content. In such a configuration, processor 906, particularly, modifying component 914 is configured to modify the pre-broadcast content based on the data.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for."

What is claimed is:

1. A system for pre-distribution of time-shifted media content to eliminate distribution delays after broadcast of media content, the system comprising:
   a pre-broadcast content transcoder configured to transcode pre-broadcast media content as a time-shifted media production that includes an as-stitched-log that indicates a linear playout of the media content in the time-shifted media production and at least one segment marker embedded therein that indicates at least one time interval in the linear playout for a respective advertisement location;

a media distribution restrictor configured to generate a distribution restrictor for preventing distribution of the time-shifted media production until the distribution restrictor is lifted;

a media content provider configured to transmit the time-shifted media production with the distribution restrictor to a content distributor before a scheduled broadcast of the broadcast media content;

an advertisement file generator configured to generate a delta file that includes an advertisement related to the broadcast media content; and an on-demand comparison engine configured to dynamically compare the as-stitched-log of the time-shifted media production with an as-run-log of the broadcast media content during the scheduled broadcast to determine a media content correspondence between the time-shifted media production and the broadcast media content, wherein the media content provider is further configured to transmit the delta file to the content distributor based on the determined media content correspondence, wherein the content distributor is further configured to dynamically re-stitch the time-shifted media production to include the delta file at the respective advertisement location indicated by the at least one segment marker, such that the dynamically re-stitched time-shifted media production is configured to be distributed to a media content consuming device to be presented thereon once the distribution restrictor is lifted.

2. The system of claim 1, further comprising a content distribution controller configured to lift the distribution restrictor upon completion of the scheduled broadcast of the broadcast media content, such that the content distributor is authorized to freely distribute the re-stitched and time-shifted media production to the media content consuming device.

3. The system of claim 2, wherein the distribution restrictor is a metadata file configured as an embargo flag associated with the transcoded media content that controls the content distributor to prevent transmission of the time-shifted media production to the media content consuming device.

4. The system of claim 1, wherein an acceptable error tolerance of the media content correspondence accounts for differences in watermarking timestamps between the as-stitched-log of the time-shifted media production and the as-run-log of the broadcast media content and alternate graphics between the media content of the time-shifted media production and the broadcast media content.

5. The system of claim 1, wherein the advertisement included in the generated delta file includes an advertisement in the broadcast media content that was not included in the media content in the time-shifted media production.

6. The system of claim 1, wherein the time-shifted media production is a pre-pitched video-on-demand file and the linear playout of the media content comprises a sequence of media assets that include program media, graphics data, audio/video data, watermarking data, and ad-splicing messages.

7. A system for pre-distribution of time-shifted media content to eliminate distribution delays after broadcast of media content, the system comprising:

a pre-broadcast content transcoder configured to transcode pre-broadcast media content as a pre-pitched video-on-demand (VOD) file that includes at least one segment marker embedded therein that indicates at least one time interval in a linear playout of the media content for a respective advertisement location;

a media content provider configured to transmit the pre-pitched VOD file to a content distributor before a scheduled broadcast of the broadcast media content, wherein the pre-pitched VOD file includes a distribution restrictor configured to prevent the content distributor from distributing the pre-pitched VOD file until the distribution restrictor is lifted;

an on-demand comparison engine configured to dynamically compare the pre-pitched VOD file with the broadcast media content during the scheduled broadcast to determine a media content correspondence between the pre-pitched VOD file and the broadcast media content; and an advertisement file provider configured to provide to the content distributor a delta file that includes an advertisement if the determined media content correspondence is greater than an acceptable error tolerance, wherein the advertisement included in the delta file includes an advertisement in the broadcast media content that was not included in the media content in the pre-pitched VOD file, and wherein the content distributor is further configured to dynamically re-stitch the pre-pitched VOD file to include the delta file at the respective advertisement location indicated by the at least one segment marker, such that the dynamically re-stitched pre-pitched VOD file is configured to be distributed to a media content consuming device to be presented thereon once the distribution restrictor is lifted.

8. The system of claim 7, wherein the pre-broadcast content transcoder is further configured to transcode the pre-broadcast media content to include an as-stitched-log that indicates the linear playout of the media content in the pre-pitched VOD file.

9. The system of claim 8, wherein the on-demand comparison engine if further configured to dynamically compare the as-stitched-log of the pre-pitched VOD file with an as-run-log of the broadcast media content to determine the media content correspondence between the pre-pitched VOD file and the broadcast media content.

10. The system of claim 7, further comprising a content distribution controller configured to lift the distribution restrictor after the content distributor dynamically re-stitches the pre-pitched VOD file to include the delta file at the respective advertisement location and upon completion of the scheduled broadcast, such that the content distributor is authorized to freely distribute the re-stitched pre-pitched VOD file to the media content consuming device.

11. The system of claim 10, wherein the distribution restrictor is a metadata file configured as an embargo flag associated with the transcoded media content that controls the content distributor to prevent transmission of the pre-pitched VOD file to the media content consuming device.

12. The system of claim 7, wherein the acceptable error tolerance of the media content correspondence accounts for differences in watermarking timestamps between the as-stitched-log of the pre-pitched VOD file and the as-run-log of the broadcast media content and alternate graphics between the media content of the pre-pitched VOD file and the broadcast media content.

13. The system of claim 7, wherein the linear playout of the media content comprises a sequence of media assets that include program media, graphics data, audio/video data, watermarking data, and ad-splicing messages.

14. A system for pre-distribution of time-shifted media content to eliminate distribution delays after broadcast of media content, the system comprising:
   a pre-broadcast content transcoder configured to transcode pre-broadcast media content as a time-shifted media production that includes a sequence of media assets;
   an on-demand comparison engine configured to determine a media content correspondence by comparing the time-shifted media production with broadcast media content that is broadcast after the pre-broadcast media content is transcoded as the time-shifted media production;
   a content distributor configured to dynamically re-stitch the time-shifted media production based on the media content correspondence to include a delta file having an advertisement in the broadcast media content that was not included in the sequence of media assets of the time-shifted media production; and
   a content distribution controller configured to authorize the content distributor to freely distribute the re-stitched time-shifted media production when the media content correspondence is within an acceptable fault tolerance that accounts for differences in timestamps between an as-stitched-log of the time-shifted media production and an as-run-log of the broadcast media content and alternate graphics between the pre-broadcast media content of the time-shifted media production and the broadcast media content.

15. The system of claim 14, wherein the time-shifted media production includes at least one segment marker embedded therein that indicates at least one time interval in the sequence of media assets corresponding to a respective advertisement location.

16. The system of claim 15, wherein the content distributor is further configured to re-stitch the time-shifted media production to include the delta file at the respective advertisement location indicated by the at least one segment marker, such that the dynamically re-stitched time-shifted media production is configured to be distributed to a media content consuming device to be presented thereon.

17. The system of claim 16,
   wherein the pre-broadcast content transcoder is further configured to transcode the pre-broadcast media content to include the as-stitched-log that indicates a linear playout of the media content in the time-shifted media production, and
   wherein the on-demand comparison engine is further configured to dynamically compare the as-stitched-log of the time-shifted media production with the as-run-log of the broadcast media content to determine the media content correspondence between the time-shifted media production and the broadcast media content.

18. The system of claim 16, further comprising a media distribution restrictor configured to generate a distribution restrictor for preventing the content distributor from transmitting the time-shifted media production to the media content consuming device for presentation thereon.

19. The system of claim 18, further comprising a content distribution controller configured to lift the distribution restrictor after the content distributor dynamically re-stitches the time-shifted media production to include the delta file at the respective advertisement location and the determined media content correspondence is within the acceptable fault tolerance, such that the content distributor is authorized to freely distribute the re-stitched time-shifted media production to the media content consuming device.

20. The system of claim 18, wherein the content distribution controller is further configured to lift the distribution restrictor after completion of a scheduled broadcast of the broadcast media content, such that the content distributor is authorized to freely distribute the re-stitched time-shifted media production to the media content consuming device.

21. The system of claim 19, wherein the distribution restrictor is a metadata file configured as an embargo flag associated with the transcoded media content that controls the content distributor to prevent transmission of the time-shifted media production to the media content consuming device.

22. The system of claim 14, wherein the sequence of media assets of the time-shifted media production includes program media, graphics data, audio/video data, watermarking data, and ad-splicing messages.

* * * * *